United States Patent
Leon

(10) Patent No.: US 7,721,463 B2
(45) Date of Patent: May 25, 2010

(54) OVEN

(76) Inventor: Ricardo Leon, 1213 Carob Way, Montebello, CA (US) 90640

( * ) Notice: Subject to any disclaimer, the term of this patent is extended or adjusted under 35 U.S.C. 154(b) by 1348 days.

(21) Appl. No.: 11/182,220

(22) Filed: Jul. 15, 2005

(65) Prior Publication Data
US 2007/0014906 A1 Jan. 18, 2007

(51) Int. Cl.
*F26B 7/00* (2006.01)
(52) U.S. Cl. ............... 34/321; 34/499; 34/425; 99/423
(58) Field of Classification Search .......... 99/423; 34/321, 499, 425; 126/21 A
See application file for complete search history.

(56) References Cited
U.S. PATENT DOCUMENTS

| | | | |
|---|---|---|---|
| 1,937,416 A | 11/1933 | Smith | 126/41 |
| 2,024,062 A | 12/1935 | Preedit | 34/5 |
| 2,639,133 A | 5/1953 | Clary | 263/33 |
| 3,745,909 A * | 7/1973 | Schlotthauer | 99/323.9 |
| 3,883,959 A * | 5/1975 | Neville | 34/599 |
| 4,048,473 A | 9/1977 | Burkhart | 219/389 |
| 4,860,461 A | 8/1989 | Tamaki et al. | 34/68 |
| 5,182,981 A | 2/1993 | Wilcox | 99/333 |
| 6,178,877 B1 | 1/2001 | Samuelson | 99/340 |
| 6,263,785 B1 | 7/2001 | Zittel | 99/348 |
| 7,143,686 B1 * | 12/2006 | Sandolo | 99/286 |
| 2004/0055474 A1 | 3/2004 | Lekic et al. | 99/330 |
| 2004/0187709 A1 | 9/2004 | Murthy et al. | 99/483 |

* cited by examiner

Primary Examiner—Steven B McAllister
Assistant Examiner—Sarah Suereth
(74) Attorney, Agent, or Firm—Kenneth L. Green

(57) ABSTRACT

An oven includes a conveying interior for moving produce through the oven and a gas fired heat source for cooking the produce conveyed through the oven. The conveying interior preferably comprises a rotating drum with a conveying spiral extending inwardly from an inner wall of the rotating drum. The rotating drum may further be sloped downward to facilitate progress of the produce through the oven, and the time spent in the oven may be controlled by controlling the rotating rate of the drum. The gas fired heat source may comprise a thermostatically controlled burner residing under the drum.

20 Claims, 4 Drawing Sheets

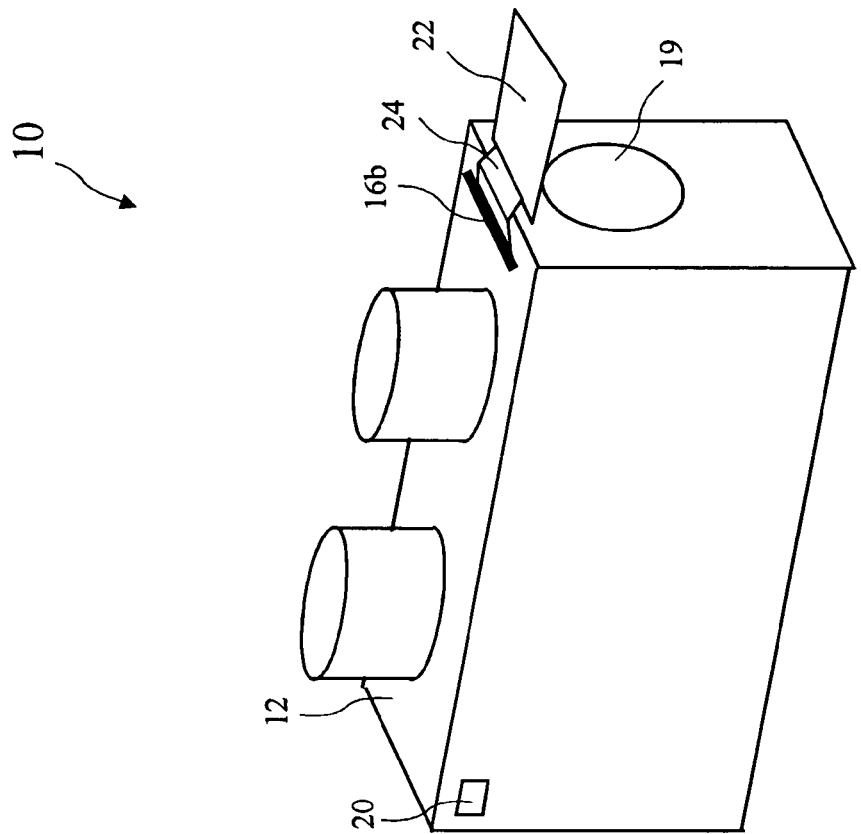
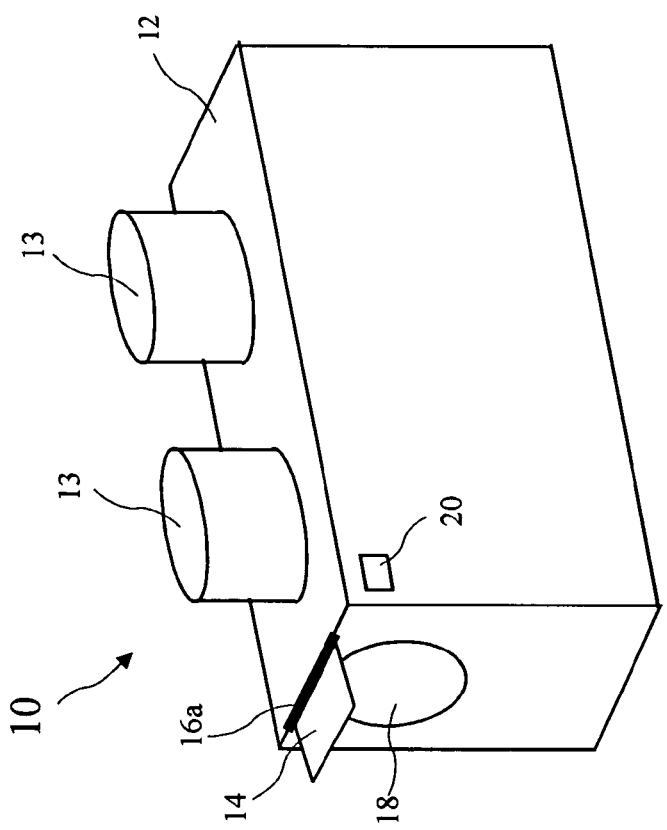

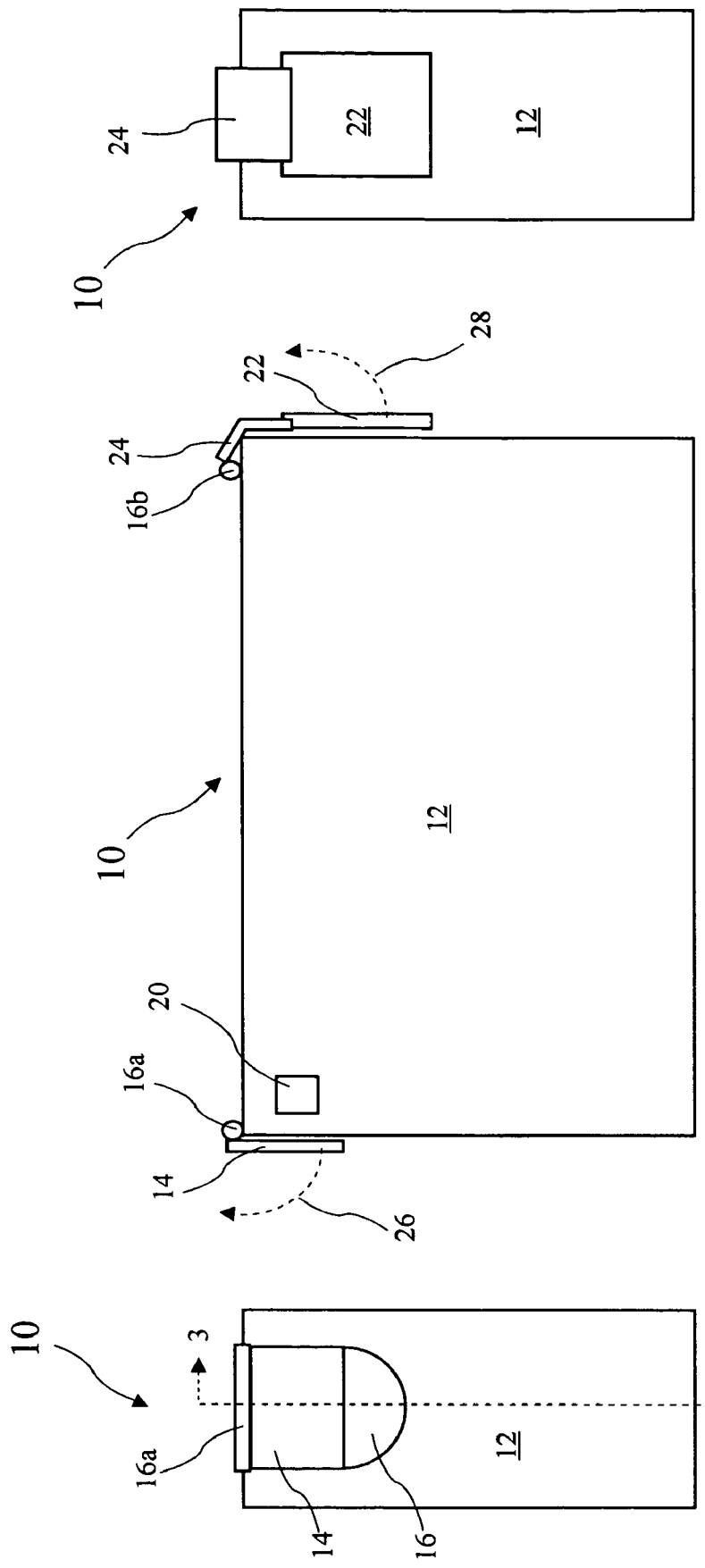

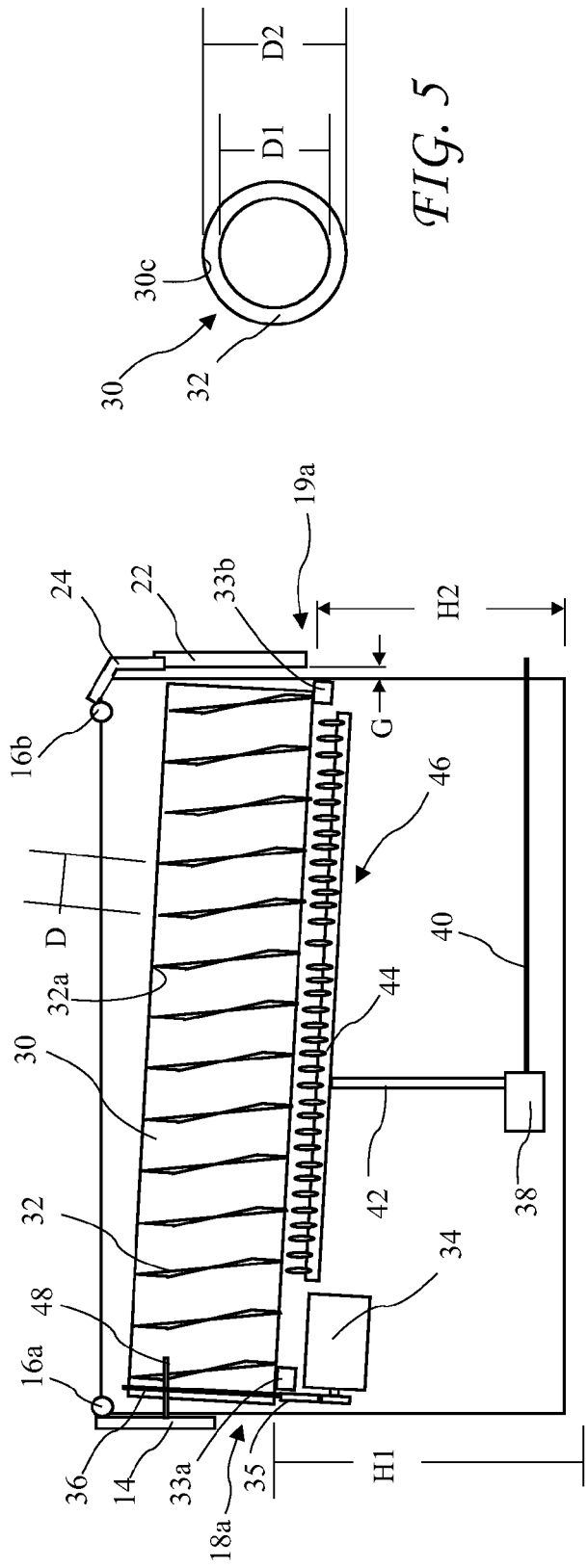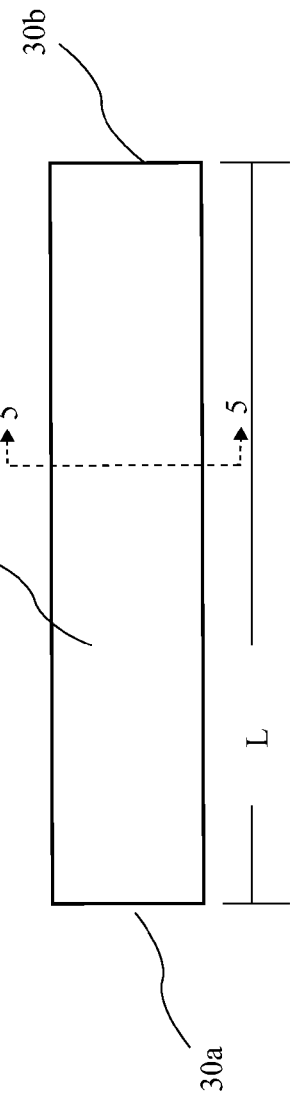
*FIG. 3*
*FIG. 4*
*FIG. 5*

OVEN

BACKGROUND OF THE INVENTION

The present invention relates to ovens and in particular to a gas fired continuous feed oven.

Salsa has become a very popular garnishment for a variety of Mexican food and various corn chips. In particular, many salsa users prefer fire roasted salsas. One of the most important steps in producing a high quality fire roasted salsa is cooking the salsa ingredients, and in a production environment, the salsa ingredients are preferably cooked in a continuous feed oven (i.e., an oven in which the produce being cooked is continuously fed into the oven and is cooked as it moves through the oven.) Known continuous feed ovens use steam to cook the salsa ingredients, but the steam cooking does not provide the desired characteristics in the cooked salsa ingredients.

There is thus a need for a gas fired continuous feed oven suitable for cooking salsa ingredients.

BRIEF SUMMARY OF THE INVENTION

The present invention addresses the above and other needs by providing an oven which includes a conveying interior for moving produce through the oven and a gas fired heat source for cooking the produce conveyed through the oven. The conveying interior preferably comprises a rotating drum with a conveying spiral extending inwardly from an inner wall of the rotating drum. The rotating drum may further be sloped downward to facilitate progress of the produce through the oven, and the time spent in the oven may be controlled by controlling the rotating rate of the drum. The gas fired heat source may comprise a thermostatically controlled burner residing under the drum.

In accordance with one aspect of the invention, there is provided a continuous feed oven including an oven housing and a rotating drum inside the oven housing. The rotating drum has a drum entrance and a drum exit and is sloped downward from the drum entrance to the drum exit at between approximately two degrees and approximately five degrees. A conveying spiral resides inside the rotating drum and advances produce through the rotating drum. The conveying spiral is fixedly attached to an inner wall of the rotating drum, an electric motor rotates the drum, and a mechanical drive rotationally connects the electric motor to the drum. A gas fired heat source resides inside the housing and produces a flame under the rotating drum and includes a blower for mixing air with gas to produce the flame under the rotating drum. A thermostat controls turning the gas fired heat source on and off to control a cooking temperature.

In accordance with another aspect of the invention, there is provided a method for cooking fire roasted salsa ingredients. The method includes feeding the salsa ingredients into a drum entrance of a rotating drum of a gas fire heated continuous feed oven, rotating the rotating drum to advance the salsa ingredients through the rotating drum, burning gas to cook the salsa ingredients in the rotating drum, and emptying the cooked salsa ingredients from the rotating drum. The gas fire may be controlled to generate a lower temperature between approximately 300 degrees Fahrenheit and approximately 400 degrees Fahrenheit, and an upper temperature between approximately 400 degrees Fahrenheit and approximately 410 degrees Fahrenheit. The rotating drum may be rotated at approximately one revolution per minute.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A is a front corner perspective view of a continuous feed oven according to the present invention.

FIG. 1B is a rear corner perspective view of the continuous feed oven according to the present invention.

FIG. 2A is a front view of the continuous feed oven.

FIG. 2B is a side view of the continuous feed oven.

FIG. 2C is a rear view of the continuous feed oven.

FIG. 3 is a cross-sectional view of the continuous feed oven taken along line 3-3 of FIG. 2A.

FIG. 4 is a side view of a rotating drum according to the present invention of the continuous feed oven.

FIG. 5 is a cross-sectional view of the rotating drum taken along line 5-5 of FIG. 4.

Corresponding reference characters indicate corresponding components throughout the several views of the drawings.

DETAILED DESCRIPTION OF THE INVENTION

Figure 6:
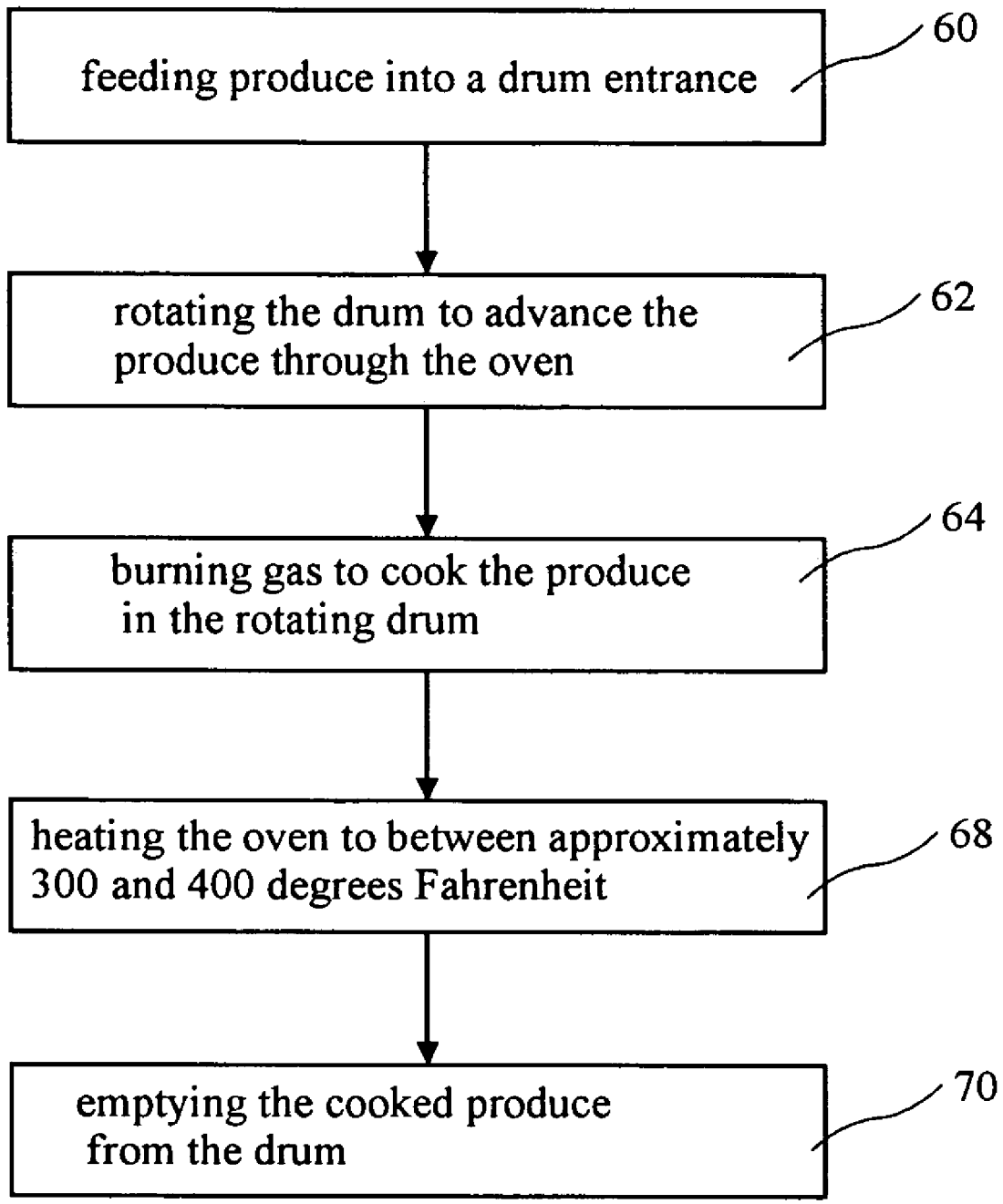
FIG. 6 is a method for cooking using the continuous feed oven of the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A front corner perspective view of a continuous feed oven 10 according to the present invention is shown in FIG. 1A and a rear corner perspective view of the continuous feed oven 10 according to the present invention is shown in FIG. 1B. The continuous feed oven 10 is advantageous in a production environment when a large quantity of material (e.g., produce) must be cooked or roasted. The oven 10 provides a continuous flow of cooked or roasted material. The continuous feed oven 10 includes a housing (or oven) entrance 18 in an oven housing 12, wherethrough produce may enter the oven 10 for cooking or roasting, and a housing (or oven) exit 19 wherethrough cooked produce may escape the oven 10 after cooking. The housing entrance 18 remains at least partially open during cooking to allow raw produce to enter the oven while earlier entering produce is being cooked, and the housing exit 19 remains at least partially open during cooking to allow cooked produce to escape the oven 10 while later entering produce is being cooked. Thus, the oven 10 is a continuous feed (or flow) oven. Vertical ducts 13 allow the oven to be vented.

A moveable entrance door 14 partially covers the entrance 18 to reduce the escape of heat from the oven 10, while allowing raw produce to be fed into the oven entrance 18 while earlier produce is being cooked within the oven 10. The door 14 preferably covers approximately half of the oven entrance 18 and the door 14 may be pivotally mounted using a first hinge 16a. An exit door 22 is moveably attached to the housing 12 and may be positioned to substantially cover the exit 19, leaving a small opening at the bottom of the exit 19 for cooked produce to exit the oven 10 while later produce is being cooked within the oven 10. The exit door 22 is preferably attached to a second hinge 16b by an arm 24 and the exit 19 is preferably lower than the entrance 18. A thermostatic control 20 resides on a side of the oven 10 for adjusting the cooking temperature inside the oven 10.

A front view of the continuous feed oven 10 is shown in FIG. 2A, a side view of the oven 10 in FIG. 2B, and a rear view of the oven 10 in FIG. 2C. The entrance door 14 is shown closed over the entrance 18 (see FIG. 1A), but may pivot about the hinge 16a as shown by arc 26 to allow access to an interior of the oven 10 for cleaning and other maintenance. The exit door 22 is shown closed over the exit 19 (see FIG. 1B) but may pivot about the hinge 16b along arc 28 to allow access to the interior of the oven 10 for cleaning and other maintenance.

A cross-sectional view of the oven 10 taken along line 3-3 of FIG. 2A is shown in FIG. 3. A rotating drum 30 resides inside the oven 10. The drum 30 both helps convey produce through the oven 10, and tumbles the produce to improve cooking of the produce. The drum 30 is rotationally supported at each end by rollers 33a and 33b, and rotated by an electric motor 34. The motor 34 is mechanically connected to the drum 30 by a mechanical connection comprising an intermediate gear 35 and a drum gear 36. The drum gear 36 may be a chain (e.g., a motorcycle type chain) welded or otherwise attached to the outside of the drum. The motor 34 is preferably a variable speed motor to allow control of the rotational speed of the drum 30.

The drum 30 preferably includes a continuous conveying spiral 32 for urging the produce through the oven 10. Consecutive 360 degree loops of the conveying spiral 32 are preferably spaced a distance D apart, wherein the distance D is preferably between approximately six inches and approximately 14 inches, and more preferably approximately ten inches. The drum 30 has a drum entrance 30a and a drum exit 30b (see FIG. 4). The drum entrance is substantially aligned with the housing entrance 18, and the drum exit 30b is substantially aligned with the housing exit 19 to allow the entrance and exit of produce into and from the oven 10. Produce serially enters the drum 30 through the entrances 18 and 30a, and serially exits the drum 30 through the exits 30b and 19. An entry mouth 18a, preferably comprising a lower half of the entrance 18 (i.e., below the bottom edge of the closed door 14), remains open during operation of the oven 10 to allow raw produce to enter the oven 10 while the oven 10 is cooking earlier entering produce. An exit mouth 19a, preferably a gap G at the bottom of the exit 19, remains open during operation of the oven 10 to allow cooked produce to exit the oven 10 while the oven 10 is cooking later entering produce. The gap preferably comprises a small gap between the drum exit 30b (see FIG. 4) and the bottom of the closed door 22.

The drum 30 has a length L (see FIG. 4) of preferably between approximately six feet and approximately 14 feet, and more preferably approximately ten feet and the drum 30 is preferably sloped downward from the drum entrance 30a to the drum exit 30b. The lowest point of drum entrance 30a is more preferably at a height H1 of approximately 45 inches and the lowest point of the drum exit 30b is more preferably at a height H2 of approximately 38 inches. Further, the drum exit 30b is preferably between approximately four inches and approximately 12 inches lower than the drum entrance 30a, and more preferably, the drum exit 30b approximately seven inches lower than the drum entrance 30a. For other length rotating drums, the slope is preferably between approximately two degrees and approximately five degrees, and is more preferably approximately 3.3 degrees.

Heat is provided to the oven 10 using a gas fired heat source. A gas line 40 provides gas to a blower 38 which mixes the gas with air to produce a gas and air mixture. The air and gas mixture is carried by a pipe 42 to a burner 44 approximately centered under the drum 30 and running substantially the length of the drum 30. The burner 44 is preferably a single pipe-like burner centered under the drum 30. Flames 46 from the burner 44 heat the drum 30 to cook produce in the drum 30. The burner 44 preferably provides approximately 600,000 BTUs of heat to the oven 10.

The heat source is controlled by the thermostat 20, and the thermostat measures the oven temperature using a heat probe 48. The heat probe 48 preferably is attached to the entrance door 14 and intrudes into the oven 10. The thermostat 20 preferably controls oven temperature by turning the burner on when the measured temperature is below a lower temperature and turning the burner off when the measured temperature is above an upper temperature.

A side view of the rotating drum 30 is shown in FIG. 4. The drum 30 has a length L of preferably between approximately six feet and approximately fourteen feet, and more preferably approximately ten feet. A cross-sectional view of the drum 30 taken along line 5-5 of FIG. 4 is shown in FIG. 5. The drum 30 has a diameter D2 which is preferably between approximately 24 inches and approximately 36 inches, and is more preferably approximately 28 inches. The conveying spiral 32 has an inside diameter D1 which is preferably between approximately twelve inches and approximately 30 inches, and more preferably approximately 20 inches. Alternatively, the conveying spiral 32 preferably extends radially inwardly from the drum 30 between approximately three inches and approximately six inches, and more preferably approximately four inches. The conveying spiral 32 is preferably continuous and is fixedly attached to the plain cylindrical interior surface 30c of the drum 30 along an outside edge 32a of the conveying spiral 32. The drum 30 and the conveying spiral 32 are preferably constructed from stainless steel.

A method according to the present invention for cooking using the continuous feed oven 10 is described in FIG. 6. The method includes feeding produce into a drum entrance of a rotating drum of a gas fire heated continuous feed oven at step 60, rotating the rotating drum to advance the produce through the rotating drum at step 62, burning gas to cook the produce in the rotating drum at step 64, heating the produce to between approximately 300 degrees Fahrenheit and approximately 410 degrees Fahrenheit at step 68, and emptying the cooked produce from the rotating drum at step 70. The produce is preferably salsa ingredients, and more preferably at least one of tomatillos, jalapenos, chiles, and garlic. The method may further include rotating the drum at approximately one revolution per minute. The produce is preferably washed before cooking, and chilled after cooking.

While the invention herein disclosed has been described by means of specific embodiments and applications thereof, numerous modifications and variations could be made thereto by those skilled in the art without departing from the scope of the invention set forth in the claims.

I claim:

1. A continuous feed oven comprising:
   an oven housing;
   a rotating drum inside the oven housing;
   an oven entrance, the oven entrance configured to remain partially open during oven operation to allow raw produce to enter the rotating drum while earlier entering produce is being cooked;
   an entrance door residing over the oven entrance and having an open position, and a closed position, the closed position allowing a minimum access to the oven entrance, the entrance door denying access to a top half of the oven entrance, and the entrance door leaving a bottom half of the oven entrance open in the closed position of the entrance door to allow raw produce to be fed into the oven entrance during operation of the oven while earlier produce is being cooked within the oven;

an oven exit, the oven exit configured to remain partially open during oven operation to allow cooked produce to escape the rotating drum while later entering produce is being cooked;

an electric motor for rotating the drum;

a mechanical connection rotationally connecting the electric motor to the drum;

a gas fired heat source inside the housing and producing a flame under the rotating drum; and a thermostatic control for controlling the gas fired heat source.

2. The oven of claim 1, further including a continuous conveying spiral inside the rotating drum for advancing produce through the rotating drum.

3. The oven of claim 1, wherein the rotating drum includes a drum entrance and a drum exit, and the rotating drum is sloped downward from the drum entrance to the drum exit.

4. The oven of claim 3, wherein the rotating drum is sloped downward at approximately 3.3 degrees.

5. The oven of claim 1, further including a temperature probe residing at least partially inside the rotating drum, and wherein the thermostatic control receives temperature measurements from the temperature probe.

6. The oven of claim 5, wherein the thermostatic control turns the gas fired heat source on when the temperature measurement is below a lower temperature and turns the gas fired heat source off when the temperature measurement is above an upper temperature.

7. The oven of claim 1, wherein:
the entrance door covers approximately the top half of the oven entrance in the closed position of the entrance door to reduce the escape of heat from the oven while allowing raw produce to be fed into the oven entrance during operation of the oven while earlier produce is being cooked within the oven.

8. The oven of claim 7, further including an exit door residing over the oven exit and having an exit door open position and an exit door closed position, the exit door leaving a gap G at the bottom of the exit door in the exit door closed position to reduce the escape of heat from the oven while allowing raw produce to be fed into the oven entrance during operation of the oven while later produce is being cooked within the oven.

9. The oven of claim 1, wherein the rotating drum is approximately ten feet long and approximately 28 inches in diameter.

10. The oven of claim 9, wherein a conveying spiral resides inside the rotating drum fixedly attached to an inner surface of the rotating drum, and the conveying spiral extends approximately four inches radially into the rotating drum.

11. The oven of claim 9, wherein consecutive 360 degree loops of the continuous conveying spiral are spaced approximately 10 inches apart.

12. The oven of claim 9, wherein the rotating drum includes a drum entrance and a drum exit and the drum exit is approximately seven inches lower than the drum entrance.

13. The oven of claim 9, wherein the electric motor is a variable speed electric motor.

14. The oven of claim 9, wherein the gas fired heat source includes a blower for mixing air with gas to produce the flame under the rotating drum.

15. A continuous feed oven comprising:
an oven housing;
a rotating drum inside the oven housing, the rotating drum having:
a drum entrance configured to remain partially open during oven operation to allow raw produce to enter the rotating drum while earlier entering produce is being cooked; and
a drum exit configured to remain partially open during oven operation to allow cooked produce to escape the drum following being cooked and while later entering produce is being cooked,
the rotating drum sloped downward from the drum entrance to the drum exit at between approximately two degrees and approximately five degrees slope;
an entrance door pivotally attached above the drum entrance and pivotable between an open position and a closed position, the closed position allowing a minimum access to the drum entrance, the entrance door leaving a vertical gap between a bottom edge of the entrance door and the bottom of the drum entrance in the closed position of the entrance door to allow raw produce to be fed into the drum entrance only through the vertical gap during operation of the oven while earlier produce is being cooked within the oven;
a continuous conveying spiral inside the rotating drum for advancing produce through the rotating drum, the conveying spiral fixedly attached to an inner wall of the rotating drum;
an electric motor for rotating the drum;
a gas fired heat source producing a flame under the rotating drum, the heat source comprising:
a gas source;
a blower for mixing air with gas provided by the gas source to produce a gas and air mixture; and
a burner residing under the rotating drum for burning the gas and air mixture; and
a thermostatic control for turning the gas fired heat source on and off.

16. The oven of claim 15, wherein;
the rotating drum is between approximately six feet and approximately 14 feet long and approximately 24 inches to approximately 36 inches in diameter;
the drum exit is approximately four inches to approximately twelve inches lower than the drum entrance;
the conveying spiral extends approximately three inches to approximately six inches radially into the rotating drum; and
consecutive 360 degree loops of the conveying spiral are spaced approximately six inches to approximately 14 inches apart.

17. A continuous feed oven comprising:
an oven housing;
a rotating drum inside the oven housing, the rotating drum having:
a drum entrance configured to remain partially open during oven operation to allow raw produce to enter the rotating drum while earlier entering produce is being cooked; and
a drum exit residing lower than the drum entrance and configured to remain partially open during oven operation to allow cooked produce to escape the drum following being cooked and while later entering produce is being cooked, and
a continuous conveying spiral inside the rotating drum for advancing produce through the rotating drum, the conveying spiral fixedly attached to an inner wall of the rotating drum and extending approximately three inches to approximately six inches radially into the rotating drum and consecutive 360 degree loops of the conveying spiral are spaced approximately six inches to approximately 14 inches a part;

the rotating drum sloped downward from the drum entrance to the drum exit at between approximately two degrees and approximately five degrees slope;

a moveable entrance door hinged at the top for opening and having an open position and a closed position and configured to cover only an approximately top half of the drum entrance when the entrance door is in the closed position;

a moveable exit door hinged at the top for opening and configured to cover substantially all of the oven exit when the exit door is closed, leaving a gap to allow cooked produce to escape the oven;

an electric motor for rotating the drum;

a gas fired heat source producing a flame under the rotating drum, the heat source comprising:
　a gas source;
　a blower for mixing air with gas provided by the gas source to produce a gas and air mixture; and
　a burner residing under the rotating drum for burning the gas and air mixture; and
a thermostatic control for turning the gas fired heat source on and off.

18. The oven of claim 17, wherein;
the rotating drum is between approximately six feet and approximately 14 feet long and approximately 24 inches to approximately 36 inches in diameter; and
the drum exit is approximately four inches to approximately twelve inches lower than the drum entrance.

19. The oven of claim 2, wherein the continuous conveying spiral is attached to a plain cylindrical interior surface for the rotating drum along an outside edge of the continuous conveying spiral.

20. The oven of claim 15, further including an exit door residing over the oven exit and having an exit door open position and an exit door closed position, the exit door leaving a gap G at the bottom of the exit door in the exit door closed position to reduce the escape of heat from the oven while allowing raw produce to be fed into the oven entrance during operation of the oven while later produce is being cooked within the oven.

* * * * *